(12) United States Patent
Tetreault et al.

(10) Patent No.: US 10,194,296 B2
(45) Date of Patent: Jan. 29, 2019

(54) MULTIFUNCTION PASS-THROUGH WALL POWER PLUG WITH COMMUNICATION RELAY AND RELATED METHOD

(71) Applicant: iDevices, LLC, Avon, CT (US)

(72) Inventors: Michael Tetreault, Simsbury, CT (US); Eric Ferguson, Simsbury, CT (US); David Davis, West Hartford, CT (US); Shawn Monteith, Burlington, CT (US); Michael Murray, Vernon, CT (US)

(73) Assignee: IDEVICES, LLC, Avon, CT (US)

( * ) Notice: Subject to any disclaimer, the term of this patent is extended or adjusted under 35 U.S.C. 154(b) by 0 days.

(21) Appl. No.: 14/823,732

(22) Filed: Aug. 11, 2015

(65) Prior Publication Data

US 2016/0044447 A1 Feb. 11, 2016

Related U.S. Application Data

(60) Provisional application No. 61/999,914, filed on Aug. 11, 2014.

(51) Int. Cl.
*G01K 1/02* (2006.01)
*H04W 4/80* (2018.01)
(Continued)

(52) U.S. Cl.
CPC .............. *H04W 4/80* (2018.02); *G01K 1/024* (2013.01); *H01R 31/065* (2013.01);
(Continued)

(58) Field of Classification Search
CPC ....... H04W 4/008; H04W 4/00; H04W 12/06; H04W 76/02; H04W 84/12; H04W 88/06;
(Continued)

(56) References Cited

U.S. PATENT DOCUMENTS 3,421,085 A 1/1969 Erickson et al.
5,914,845 A 6/1999 Chase
(Continued)

FOREIGN PATENT DOCUMENTS

JP 2005235729 A 9/2005
JP 2007519317 A 7/2007
(Continued)

OTHER PUBLICATIONS

Written Opinion for International Application No. PCT/US2015/044703 dated Oct. 28, 2015. 6 pages.
(Continued)

*Primary Examiner* — Golam Sorowar
(74) *Attorney, Agent, or Firm* — Dority & Manning, P.A.

(57) ABSTRACT

A pass through wall power plug is equipped with multiple transceivers for remote communication. The power plug may be equipped with transceivers operative in different modes or protocols. The power plug may function as a bridge between radio devices. It may function as a centralized access point for receiving and/or storing information from and transmitting information multiple connected electronic devices. The power plug may be equipped with a night light, power meter, relay switch, voltage meter, beacon, proximity sensor or other electronic components. The power plug may be made rotatable around its prongs, and may be configured to be stackable within a standard column of electrical outlets.

12 Claims, 7 Drawing Sheets

(51) Int. Cl.
  *H01R 13/66*    (2006.01)
  *H01R 31/06*    (2006.01)
  *H04L 12/28*    (2006.01)
  *H04L 29/06*    (2006.01)
  *H04L 29/08*    (2006.01)
  *H01R 13/717*   (2006.01)

(52) U.S. Cl.
  CPC .......... *H04L 12/2838* (2013.01); *H04L 69/08* (2013.01); *H04L 69/18* (2013.01); *H01R 13/6691* (2013.01); *H01R 13/7175* (2013.01); *H04L 67/2842* (2013.01); *H04L 2012/2841* (2013.01)

(58) Field of Classification Search
  CPC ............ Y02B 70/3266; Y02B 90/2653; Y02B 90/226; Y02B 20/46; Y02B 20/48; Y02B 70/3225; Y02B 90/2615; Y04S 20/242; Y04S 40/126; Y04S 20/16; Y04S 10/126; Y04S 10/56; Y04S 20/222; Y04S 30/14; Y04S 40/121; H02J 3/14; H02J 13/0075; H02J 2003/143; H02J 13/0006; H02J 13/002; H02J 13/0079; H02J 3/00; H02J 3/005; H02J 7/0004
  See application file for complete search history.

(56) References Cited

U.S. PATENT DOCUMENTS

| | | | | |
|---|---|---|---|---|
| 7,611,253 | B2 * | 11/2009 | Chien | F21S 8/035 |
| | | | | 362/276 |
| 7,845,951 | B1 * | 12/2010 | Goon | H01R 31/06 |
| | | | | 439/21 |
| 8,931,400 | B1 | 1/2015 | Allen | |
| 9,013,283 | B1 | 4/2015 | Tackaberry | |
| 2006/0148403 | A1 | 7/2006 | Martin | |
| 2006/0161270 | A1 | 7/2006 | Luskin et al. | |
| 2009/0207034 | A1 | 8/2009 | Tinaphong et al. | |
| 2010/0044195 | A1 | 2/2010 | Chiang et al. | |
| 2010/0060187 | A1 | 3/2010 | Newman, Jr. et al. | |
| 2010/0290390 | A1 * | 11/2010 | Souissi | H04L 63/0236 |
| | | | | 370/328 |
| 2011/0320636 | A1 | 12/2011 | Young et al. | |
| 2012/0060044 | A1 | 3/2012 | Jonsson et al. | |
| 2013/0069617 | A1 * | 3/2013 | Lee | H01R 31/065 |
| | | | | 323/318 |
| 2013/0234534 | A1 * | 9/2013 | Lin | H02J 13/0075 |
| | | | | 307/112 |
| 2013/0261821 | A1 | 10/2013 | Lu et al. | |
| 2013/0338844 | A1 | 12/2013 | Chan et al. | |
| 2013/0339766 | A1 | 12/2013 | Chen et al. | |
| 2014/0028210 | A1 * | 1/2014 | Maxik | F21V 23/06 |
| | | | | 315/200 R |
| 2014/0070959 | A1 | 3/2014 | Bhargava et al. | |
| 2014/0104067 | A1 | 4/2014 | Chien | |
| 2014/0163751 | A1 | 6/2014 | Davis et al. | |
| 2014/0266669 | A1 * | 9/2014 | Fadell | G05B 19/042 |
| | | | | 340/501 |
| 2014/0308844 | A1 * | 10/2014 | Beharrell | H01R 13/514 |
| | | | | 439/521 |
| 2014/0325245 | A1 | 10/2014 | Santini et al. | |
| 2015/0077021 | A1 | 3/2015 | Smith et al. | |
| 2016/0040903 | A1 * | 2/2016 | Emmons | H04L 67/1078 |
| | | | | 700/278 |
| 2016/0150057 | A1 | 5/2016 | Men et al. | |
| 2016/0190748 | A1 | 6/2016 | Emby | |
| 2016/0239033 | A1 | 8/2016 | Pan et al. | |

FOREIGN PATENT DOCUMENTS

| | | |
|---|---|---|
| JP | 2013004394 A | 1/2013 |
| WO | WO02071202 | 9/2002 |
| WO | 2005057834 A1 | 6/2005 |

OTHER PUBLICATIONS

Edimax Networking People Together—Quick Installation Guide, 23 pages, Dec. 2013.
Extended European Search Report for corresponding European Application No. 15832207.3, dated Jun. 14, 2018—11 pages.

* cited by examiner

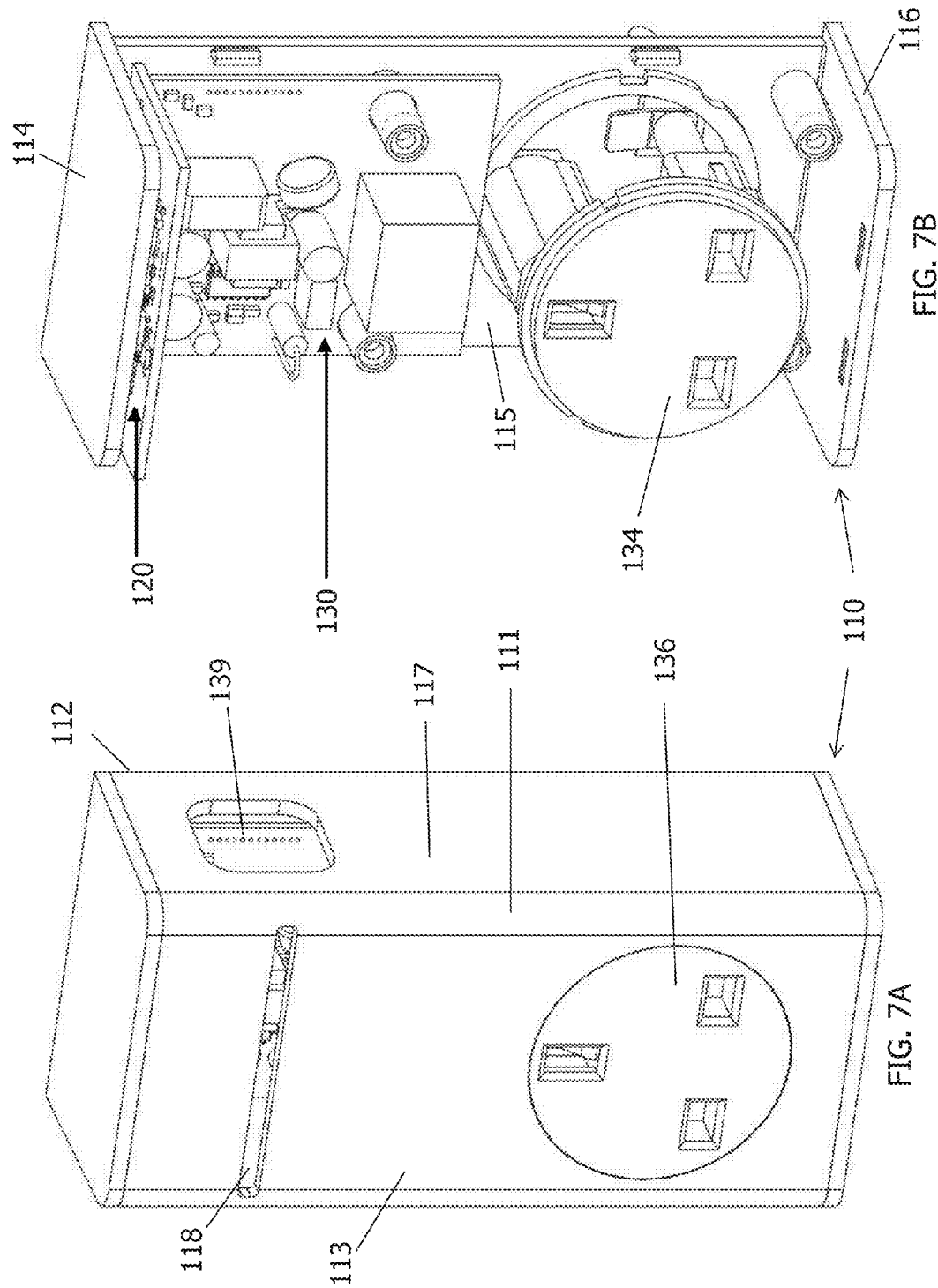

MULTIFUNCTION PASS-THROUGH WALL POWER PLUG WITH COMMUNICATION RELAY AND RELATED METHOD

CROSS-REFERENCE TO RELATED APPLICATIONS

This application claims benefit under 35 U.S.C. § 119(e) to U.S. Provisional Patent Application No. 61/999,914, filed Aug. 11, 2014, which is incorporated herein by reference in its entirety and made a part hereof.

FIELD OF THE DISCLOSURE

The present disclosure relates generally to remote communication with electronic devices. More specifically, the present disclosure relates to wall power plugs that are equipped with modules for multiple modes of remote communication and are thereby capable of serving as a hub between connected electronic devices, and equipped with various functionalities. In addition, the present disclosure relates to methods of remote communication with electronic devices using a plug equipped with multiple modes of remote communication.

BACKGROUND INFORMATION

Contemporary homes, offices and buildings can be equipped with various devices that are capable of remote communication with a computerized device, e.g., a Smartphone or a computer. These devices include a radio for wireless communication, e.g., Wi-Fi, Bluetooth, Bluetooth Low Energy (BLE), etc. These devices communicate with remote devices, either a direct connection to the device, e.g., Bluetooth pairing with the device, or though the internet via an internet access point, e.g., a Wi-Fi router. Such devices include, but are not limited to, doors, lights, lamps, thermometers, thermostats, garage doors, pool control systems, and appliances such as air conditioners, refrigerators, induction stove tops, ranges, and laundry machines. By way of example, U.S. Pat. No. 8,931,400 discloses temperature monitoring systems and methods whereby the temperature status of an item or items may be remotely monitored.

One category of remote communication device is termed a smartplug. Generally speaking, a smartplug is a power outlet connected to power line, e.g., a wall electrical outlet, that has a wireless radio for communication with a remote device. The remote device may be used to control the power state of the smartplug, that is, on or off, to control power delivery to the devices plugged into the smartplug. In some instances, the smartplug can relay information to the remote device, e.g., the power usage of the device(s) plugged into smartplug, as measured by a power meter incorporated into the smartplug. With respect to smartplugs, the power usage of the wireless radio is not of much concern, because the radio is powered by the power line to which the plug is connected.

Many other devices, though, are not directly connected to a power line. In many cases, it is not practical, or would be expensive, to connect them to a power line. For example, devices such as thermostats or door locks would be impractical to connect to a power line, especially where the device is being retrofitted into a location where no power line currently exists. Nor do these devices typically have power cords to connect to a smartplug, as such would often be impractical. These devices typically run on battery power, and the batteries also power the wireless radio. In many applications, the high power requirements of a Wi-Fi radio make Wi-Fi communication with these battery-powered devices not practical. The batteries would drain quickly and need to be changed or recharged. Even where the batteries are changed or recharged relatively easily, this is a nuisance and cost to the user, and there is a risk the battery would drain before the battery could be changed or recharged.

One solution has been to use lower power wireless radios, such as Bluetooth, and later, BLE. However, while Bluetooth and Bluetooth Low Energy radios require less energy than Wi-Fi radios, Bluetooth technology has a limited range that renders them unsuitable for the longer distance communication needed to communicate with the internet access point, which may be located at a significant distance from the device. The result is that such Bluetooth enabled devices are not designed to connect to the internet and communicate with remote devices outside the range of the wireless radio, and it is not possible to communicate with or control, for example, a door locking mechanism, using a remote device that is not at or near the location of the device. Instead, these devices are designed to communicate with remote devices, typically mobile devices, e.g., a Smartphone, that is brought within the range of the device. In the case of Bluetooth communication, the device and remote device must also first pair, or establish the communication connection, each time the two are brought into range with each other. This process takes a certain amount of time to complete, resulting in a delay before the two can communicate with each other.

SUMMARY OF THE INVENTION

In view of the above, the inventors have determined that it would be advantageous to have a pass through wall power plug that is equipped with multiple modes of communication and other types of functionality to address one or more of the drawbacks identified in previously-known devices.

Accordingly, the present disclosure relates to a pass-through wall power plug that is equipped with multiple modes of communication and various additional modes of functionality. In some embodiments, the wall plug incorporates both a long-range communication protocol radio, such as Wi-Fi, and a short-range communication protocol, such as Bluetooth and/or Bluetooth Low Energy, for communication with both short-range devices, e.g., Bluetooth, and devices located at farther and off-site locations, and a microcontroller capable of translating between the two communications protocols, so as to permit communications between device and remote devices. In certain embodiments, the height of the power plug is the approximate height or dimensions of a standard wall power plug, so that access to and use of adjacent power outlets are not hindered or blocked.

The pass-through wall power plug comprises in some embodiments power prongs that can be plugged into an electrical outlet, a power socket into which an external electrical device appliance can be plugged in; optionally an AC/DC converter and/or voltage regulator which converts line voltage to a voltage and/or direct current suitable for powering other modules; at least two wireless radios, e.g., a Bluetooth radio module configured to communicate with Bluetooth radio-capable devices and a Wi-Fi radio module that can communicate with Wi-Fi radio devices; and a microcontroller. The microcontroller can be configured to perform the following functions: receiving and transmitting communications from first remote devices using a first radio, e.g., via Wi-Fi communication; receiving and transmitting communications from second remote devices using a second radio, e.g., via Bluetooth communication; and relaying communications between the first and second radio modules, thereby enabling first and second remote devices to communicate.

In some embodiments, the microcontroller is configured to perform a beacon function to transmit signals, such as targeted messages or information, to an electronic device within range thereof. In some embodiments, the range of the beacon function is approximately 200 feet. An exemplary protocol for a beacon function is the iBeacon protocol developed by Apple, Inc. Using a protocol such as the iBeacon protocol, the pass-through wall plug may be configured to transmit targeted messages or information to users.

In some embodiments, the pass-through wall power plug is configured to detect the proximity or distance of remote electronic devices. Proximity may be monitored or measured based on the strength of a signal received from a remote electronic device. The microcontroller may be programmed to perform certain functions when a remote electronic device is brought to within a certain proximity or distance, or brought beyond a certain proximity or distance.

In some embodiments, the pass through wall power plug comprises a relay or other switch that controls power supply to an external device connected to the power plug. The relay or switch may be controlled physically using a button that is accessed through an external housing of the power plug. In addition, the microcontroller may be configured to respond to remote instructions to actuate the switch or relay to turn the power to the device on or off.

Some embodiments may comprise a power-measuring device configured to measure power used by a device connected to the plug, for example, a voltmeter that is configured to measure the tension across an embedded low impedance resistor to determine the current drawn by an external device or appliance. In some such embodiments, the microcontroller may be configured to measure the current used by the external device and transmit that information to other devices or computers. Some embodiments may comprise a thermometer that can measure the temperature of internal components of the power plug. In some such embodiments, the microcontroller is configured to relay temperature information to a remote electronic device.

In some embodiments, the pass-through wall power plug comprises a hardware authentication module or a hardware security module. The hardware authentication module may be configured to limit permitted radio communication to only specific external devices. In some embodiments, the microcomputer is adapted to store authentication tokens, which may be used to authorize certain services provided by computers on the Internet.

In some embodiments, the pass-through wall power plug comprises a light bar including a light source, which in some embodiments comprises an LED light source or series of LED light sources. In some such embodiments, such LED lights are configured to provide signaling or 'nightlight' capability and/or function. In further of such embodiments, the microcontroller may be configured to turn the LEDs on and off when instructed by other devices and computers via radio connections. The microcontroller may also be configured to turn change the brightness or color of the LED light or lights in response to a command received from a remote device.

In some embodiments, the height or width of the pass-through wall power plug is configured to be approximately the same height as a conventional outlet electrical socket. In such embodiments, the plug does not hinder or block access to an adjacent electrical outlet within an electrical faceplate.

In some embodiments, the pass-through wall power plug comprises a rotating mechanism that enables the device to be rotated around the wall plug connection.

The present disclosure also relates to a method for remote communication between a mobile device, such as a smart phone, tablet, or computer, and a Bluetooth-connected appliance. The pass through wall power plug may serve as a bridge between at least one device and at least one remote device. It may alternatively or in addition serve as a bridge between multiple devices. Advantageously, the pass through wall power plug enables communication between devices that, due to power limitations, are not able to communicate.

The pass through wall power plug may also in certain embodiments receive and/or store information from multiple devices and transmit such information to a remote device. The power plug may in some such embodiments collect data, such as but not limited to, power usage, from one or more devices and communicate this data to a remote device or computer. The remote device or computer may communicate information, such as but not limited to instructions, to the one or more devices using the power plug as a bridge.

Other objects and advantages of the present invention will become apparent in view of the following detailed description of embodiments and the accompanying drawings.

BRIEF DESCRIPTION OF THE DRAWINGS

So that those having ordinary skill in the art to which the present disclosure pertains will more readily understand how to make and use the invention, reference may be had to the drawings wherein:

FIGS. 7A and 7B are a front elevational view of another embodiment of a pass through wall plug.

DETAILED DESCRIPTION OF EMBODIMENTS OF THE INVENTION

Figure 1:
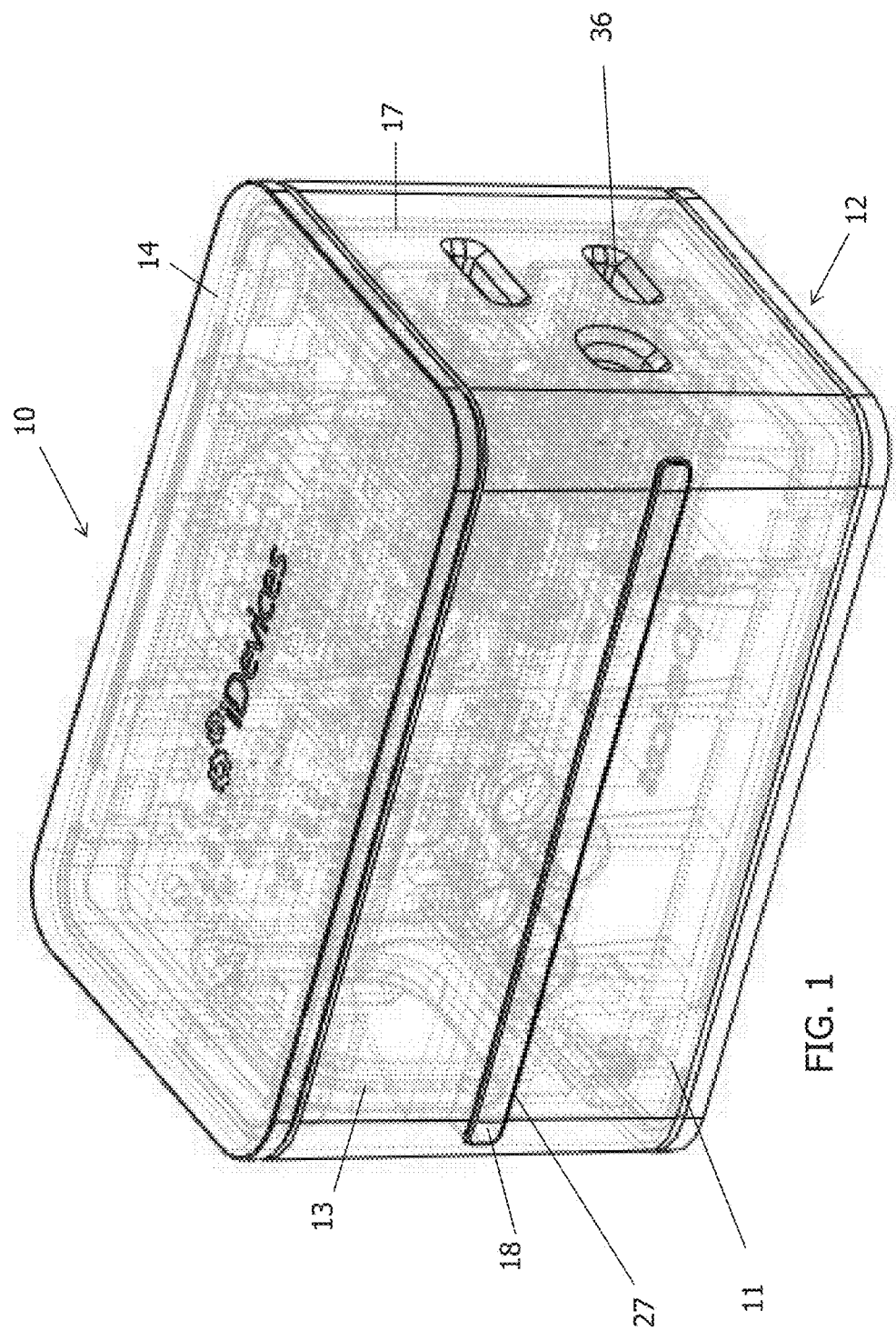
FIG. 1 is a front perspective view of a pass through wall power plug.

Referring to FIG. 1, an embodiment of pass through wall power plug 10 is shown. The power plug 10 is encased by a housing 12, which includes a casing 11 substantially laterally surrounding the internal components of the plug and to which is attached, e.g., snap fit into, a top cover 14 and a bottom cover 16. In the embodiment shown, casing 11, top cover 14, and bottom cover 16 form a substantially brick-like shape. The longest axis of the substantially brick-like shape is oriented in a horizontal direction when the plug is inserted into a typically oriented electrical socket in the United States. This orientation is advantageous in that it enables the power plug 10 to fit compactly within the vertical space corresponding to a single electrical outlet within a standard North American faceplate. Thus, more than one power plug 10 may be plugged into a faceplate with multiple outlets, in a configuration resembling a stack. However, the power plug 10 may take any geometric shape suitable for containing the elements and effecting the functions described herein, for any electrical outlet configuration that is used worldwide.

A front face 13 of casing 11 contains an opening 27 through which light bar 18 is located or otherwise visible. In the embodiment shown, light bar 18 is oriented at approximately the mid-level of the casing 11. However, light bar 18 may also be oriented at various heights above and below the mid-level of casing 11, so long as the placement of the light bar does not interfere with the placement of other internal components of power plug 10. In the embodiment shown, light bar 18 extends across substantially the entire length of casing 11. Advantageously, this configuration maximizes the light emitted from the power plug and also indicates the full profile of the power plug in a dimly lit room. In certain embodiments, the light bar 18 functions as a "night light" so as to provide light in a dimly lit or dark room. In other embodiments, however, the night light may occupy only a portion of the width of the power plug. Moreover, although in the present embodiment light bar 18 is presented in the form of a continuous bar, light bar 18 may take any other form suitable for emission of light out of housing 12. Such suitable forms include, but are not limited to, a row of circular points or a row of slit-like points.

Light bar 18 may display light from one or more internal lighting elements (not shown) located within housing 12. The lighting elements may be LEDs. The lighting elements may be turned on and off, and the light displayed through the lighting elements may be adjusted in brightness or color, in accordance with the desire of a particular user, in a manner as would be understood by those of ordinary skill in the art. The lighting elements may in some embodiments be controlled wirelessly using a remote device (not shown in FIG. 1) such as a smart phone. In some instances, the remote device may include a computer program, e.g., an application, for interface between the user of the remote device and the power plug 10, that is configured to control the brightness and color of the lighting devices. One exemplary application is the HomeKit® application marketed by Apple, Inc.

Still referring to FIG. 1, side face 17 of casing 11 contains external female socket 36. External socket 36 is oriented at a right angle to light bar 18, e.g., on a side face of the casing 11. Advantageously, this female socket or plug receptacle 36 is thus placed in a location in which it does not block or disrupt the appearance of light bar 18. In addition, placement of socket 36 on a side facing 17 of the housing 12 minimizes the overall profile of power plug 10 in use. Because socket 36 is side facing, when a power cord is inserted into the socket 36, the power cord does not increase the power plug's overall extension from the wall. External socket 36 is configured to receive a plug for a power cord that may transmit power to any suitable electrically powered device, machine, or appliance. Exemplary devices include, but are not limited to an air conditioner, light, refrigerator, freezer, washing machine, dryer, induction stove, humidifier, fan, computer, television, vacuum cleaner, or garage door opener. In the embodiment shown, socket 36 is configured to receive plugs arranged in a standard North American configuration. However, socket 36 can be configured to receive a plug from any configuration of electrical plugs known or that may later become known.

Figure 2:
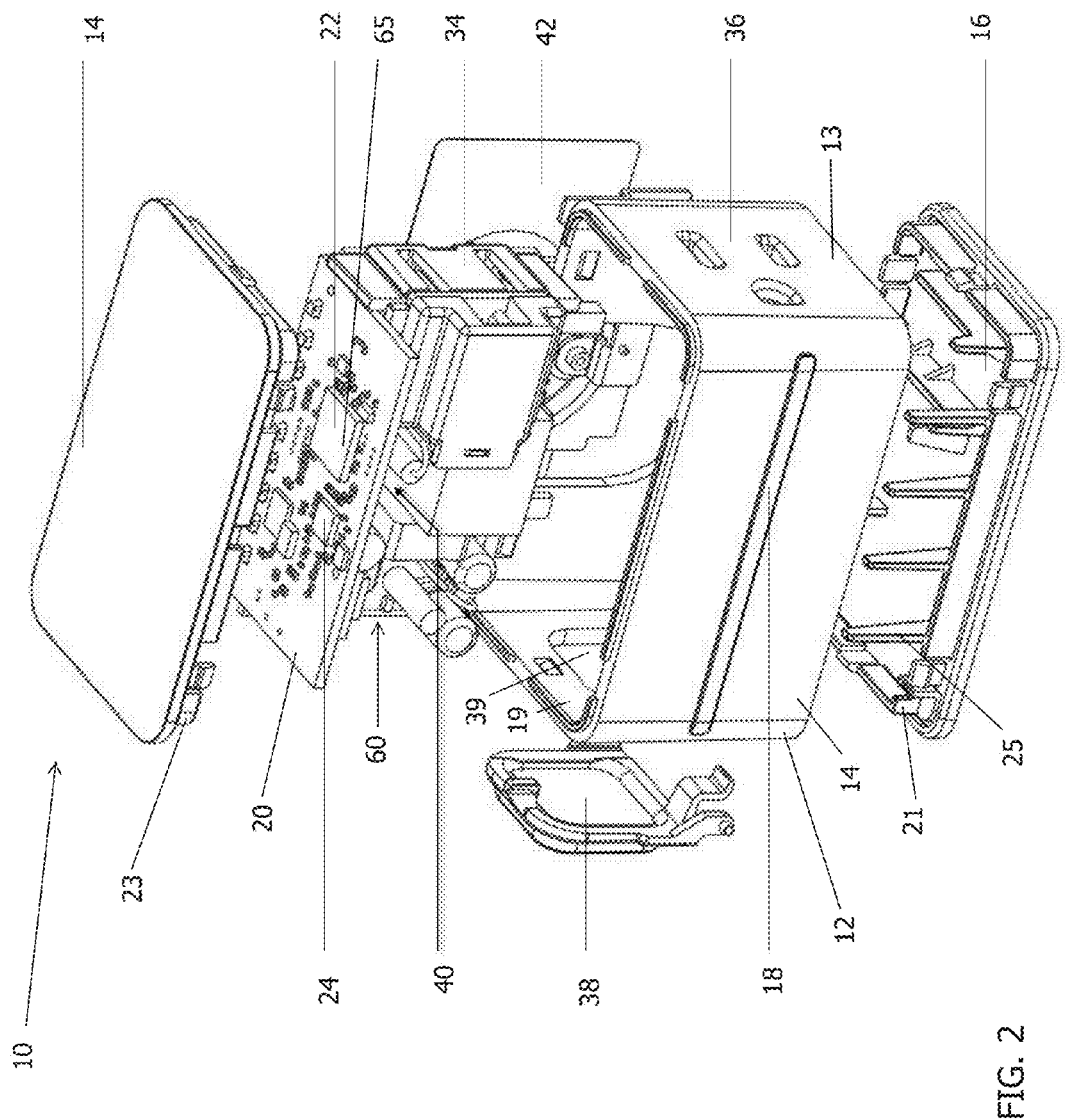
FIG. 2 is an exploded front perspective view of the plug of FIG. 1 showing the internal components thereof.
Figure 3:
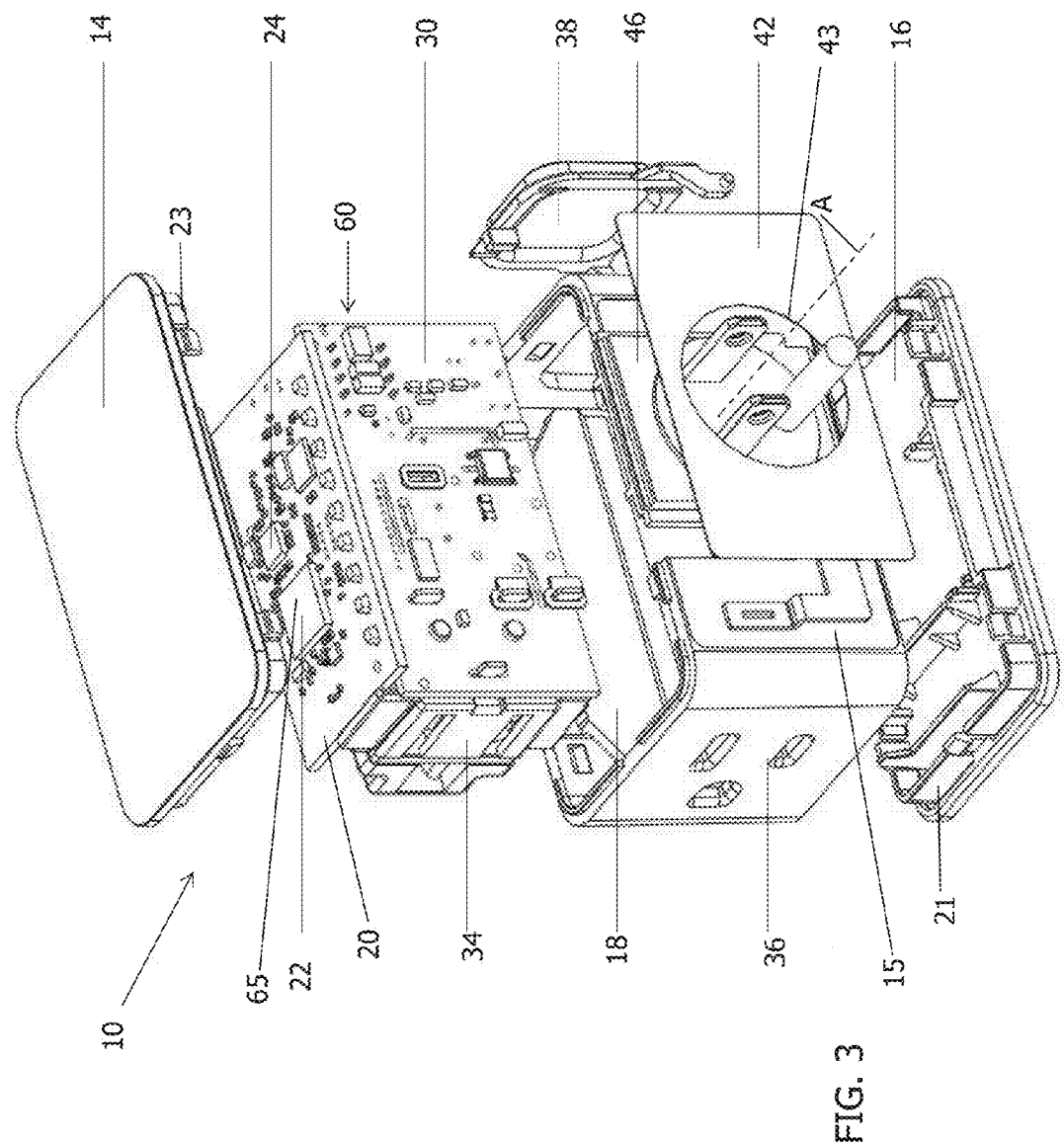
FIG. 3 is an exploded rear perspective view of the plug of FIG. 1.

FIGS. 2 and 3 display an exploded view of the power plug 10, for viewing internal components of the power plug 10. Side face 19 of casing 11 contains an opening 39 into which button 38 is inserted. Button 38 is operatively connected to a switch (not shown) on power board 30. The switch in some embodiments is a relay-type switch configured to control electrical power to the socket 36, i.e., to a power cord that is plugged into socket 36. However, the switch may be any suitable type of switch as would be understood by those of ordinary skill in the art. The button in some embodiments alternatively or additionally controls power to any or all of the specific modules contained within the pass through wall power plug 10, such as wireless communication module 20. In addition to being controlled by the button, the switch may be configured to be controlled in response to wirelessly communicated commands, as further discussed below.

Referring to bottom cover 16 and top cover 14, protrusions 21 are attached to bottom cover 16 and the bottom portion of casing 11 has complimentary structure, so as to enable a snap-fit connection between bottom cover 16 and casing 11 in a known manner. Protrusions 23 are attached to top cover 14 and the top portion of casing 11 has structure complimentary structure thereto to enable snap-fit connection of these parts. While the embodiment displayed in FIGS. 2 and 3 is held together via snap fitting, the bottom cover 16, top cover 14, and casing 11 can be attached to each other through any suitable mechanism known to those in the art, including but not limited to adhesives, fasteners, screws, nails, or brackets. Bottom cover 16 also has a plurality of long protrusions 25. The long protrusions provide support for light bar 18 and prevent it from being dislodged from the opening 27.

Male power plug 46 extends through an opening 43 in rear face 15. Male power plug 46 is electrically attached to power board 30 in any manner as would be understood by those of skill in the art, including, for example only, beryllium copper spring clips. Male power plug 46 may alternatively be attached to the housing in a fashion as would be understood by those of ordinary skill in the art that enables the housing to rotate around axis "A." This advantageously allows a user to rotate the plug 10 into an orientation that is desired by or convenient for the user. Though power plug 46 is shown in FIG. 3 as having a three-prong configuration, power plug 46 may have any suitable configuration to electrically connect to a power source. It may also take the form of a female socket as would be understood by those of ordinary skill in the art.

A label 42 may be affixed to rear face 15 through any suitable mechanism, as would be understood by those of ordinary skill in the art, e.g., adhesive. The label may contain printed information, such as, for example, information required to be displayed by regulatory authorities, directions for operation of the power plug 10, etc. In the embodiment shown, the label 42 contains a hole 43 through which the prongs of power plug 46 may extend unimpeded. Advantageously, when the label 43 is thus affixed to the rear face 15, it does not interfere with the visual impression on the user when the power plug 10 is plugged into an outlet. However, specification label may also be affixed to any other suitable surface of the casing 11, bottom cover 16, or top cover 14.

Still referring to FIGS. 2 and 3, internal module 60 is enclosed within housing 12 of power plug 10. Internal module 60 comprises three printed circuit boards: wireless communication board 20, AC power board 30, and power meter board 40.

Wireless communication board 20 includes at least two modules for wireless communication. In some embodiments, one of the modules for wireless communication operates at a comparatively short range, such as the range of a single room, while the other module operates at a comparatively longer range. Advantageously, in this embodiment the power plug 10 is configured to communicate with multiple types of devices that have only one mode or protocol of wireless communication. In the embodiment shown, the modules for wireless communication include a Wi-Fi transceiver 22 and Bluetooth Low Energy transceiver 24. An advantage of using these two modules is that the Bluetooth Low Energy transceiver 24 can be utilized to communicate with local Bluetooth devices that need to use comparatively low energy, e.g., battery operated, while the Wi-Fi transceiver 22 can be used for comparatively longer range communication, e.g., a Wi-Fi internet access point. However, the modules can be configured to operate using any mode of wireless communication currently known or may later become known, including but not limited to, R-F communication, infrared communication, Bluetooth communication, Bluetooth low energy (BLE), cellular, and Wi-Fi communication.

AC power board 30, seen in FIG. 3, is electrically connected to power plug 46. AC power board 30 is also electrically connected to other modules within power plug 10, such as wireless communication board 20 and power meter board 40. Power board 30 includes an AC/DC converter for converting alternating current line power flowing into the plug 10 from the electrical outlet to which the plug 10 is electrically connected (e.g., via power plug 46) into direct current power suitable for powering the various modules and functions of power plug 10. Power board 30 may also contain a voltage converter converting the line voltage to a suitable voltage for the plug 10 components.

Power meter board 40, whose location is indicated in FIG. 2, is electrically connected to internal socket 34. Power meter board 40 is configured, as would be understood by those of ordinary skill in the art, to measure the power flowing to a device plugged into socket 34. Power meter board 40, for example, may include a voltmeter (not shown) that can measure the tension across an embedded low impedance resistor to determine the current drawn by an external appliance (not shown) that is plugged into internal socket 34. Though in the illustrated embodiment one internal socket 34 is shown, as should be appreciated, the plug 10 may include more than one socket 34 to provide electrical power to multiple devices.

In some embodiments, the internal module 60 also includes an electronic thermometer for measuring the temperature of the internal module 60. In other embodiments, the internal module 60 includes a hardware authentication module that can authorize communication with specific external radio devices. The hardware authentication module can use any method of authorization or encryption, known to those of skill in the art, including, for example, RSA, Diffie-Hellman (DH), or elliptic curve cryptography (ECC).

Internal module 60 also includes a microcontroller 65 for controlling the various functions of power plug 10. The microcontroller 65 may include a software storage device and a CPU. The storage device may comprise any suitable, computer-readable storage medium such as disk, non-volatile memory, etc., as will be understood by those of ordinary skill in the art (e.g., read-only memory (ROM), erasable programmable ROM (EPROM), electrically-erasable programmable ROM (EEPROM), flash memory, field-programmable gate array (FPGA), etc.). Software contained or embedded on the storage device may be embodied as computer-readable program code and executed by the CPU using any suitable high or low level computing language as would be understood by those of ordinary skill in the art, such as, but not limited to, Python, Java, C, C++, C#, .NET, MATLAB, etc. The CPU may include any suitable single- or multiple-core microprocessor of any suitable architecture that is capable of implementing and running a control protocol for the functions performed by power plug 10.

The microcontroller 65 can perform, via its software, one or more of the following functions, in response to a user command: turn the relay switch on and off, for controlling the power delivered to a device plugged in to socket 34; turn individual LEDs on and off; change the color or brightness of the LEDs, in accordance with a user's desire to use the light bar 18 in a particular fashion, such as for signaling or night light use. The microcontroller 65 may also be configured to control the switch that may in certain embodiments be manually operated by button 38, and execute wirelessly delivered commands for the switch.

The microcontroller 65 may also direct the wireless communication module to transmit a beacon message to any electronic device within a particular range of the power plug 10. The beacon function enables the plug 10 to transmit signals, such as targeted messages or information, to any mobile device within a certain range. In some embodiments, the range of the beacon function is approximately 200 feet. An exemplary protocol for a beacon function is the iBeacon protocol developed by Apple, Inc. The beacon function, can for example, transmit to a user the status of the plug 10, the status of a device plugged into the socket 34 (e.g., power on or off), the status of a device in wireless communication with the plug 10, or any other desired information as programmed in the microcontroller 65. By way of example, if the plug 10 is in wireless communication with a carbon monoxide detector that is programmed to wirelessly transmit an alert, e.g., to the plug 10, if an elevated or dangerous carbon monoxide level is detected, the plug 10 can transmit a beacon message that will be received by a user's remote device warning of the danger. For example, the beacon message could warn persons approaching the location not to enter due to the dangerous conditions. Advantages of the invention include that, using the above as an example, that the multi-mode communication capabilities of the plug 10 may permit in some embodiments transmission of the beacon message over multiple protocols, including longer range protocols than the carbon monoxide detector may have (e.g., Wi-Fi as opposed to Bluetooth), providing earlier warning to persons. In addition, as the plug 10 is connected to an electrical power line, there is no risk of the transmission of the message terminating due to a drained battery, e.g. of the carbon monoxide detector.

The Bluetooth Low Energy transceiver 24 may also detect proximity of remote devices (e.g., mobile devices), and the microcontroller 65 may direct certain actions in response to such proximity. Physical proximity can be monitored by measuring the strength of a signal received (e.g., dB strength) from a remote electronic device. The microcontroller 65 can be programmed with an algorithm or table that correlates signal strength with distance. For example, upon determining that a user's smart phone is within a certain distance of the plug 10, the microcontroller 65 can instruct a Bluetooth-connected lamp to turn on, or some other device (e.g., heating/cooling, music player, etc.). By way of another example, the microcontroller 65 can be directed to actuate the relay switch, i.e., that is operatively connected to button 38, when the proximity sensor is triggered, thereby powering the device plugged into the socket 34. Likewise, the proximity function can turn off a device or take other action when it detects the user (via the user's smart phone) has moved a certain distance away from the plug 10. For example, when the user moves a certain distance away from the plug 10 indicating the user has left the premises, the plug 10 can transmit a command signal to a door lock (e.g., via BLE) to lock the door and secure the premises.

The proximity capabilities of the plug 10 has various advantages over known detection systems, such as motion sensors, heat sensors, laser, ultrasound or radar detection systems because it does not rely on or require line of sight to detect the user. Moreover, some systems, such as some types of motion sensors, can be "fooled" into determining that no one is present, such as when, for example, the person is motionless or relatively motionless. In addition, many prior systems require a delay or period of time in which no one is detected before taking further action, e.g., shutting off a light. This delay results in wasted energy. In contrast, the invention permits devices to be controlled based on the present location of the user.

The microcontroller 65 may also store and transmit information about the operation of the power plug to a user. For example, the microcontroller 65 may store and transmit information from the thermometer about the temperature of the power plug, or about the electrical current delivered to an appliance that is electrically connected to socket 36. The microcontroller 65 may also store authentication tokens that are used to authorize connection with certain remote devices, in accordance with the security protocol installed on the hardware authentication module.

Figure 4:
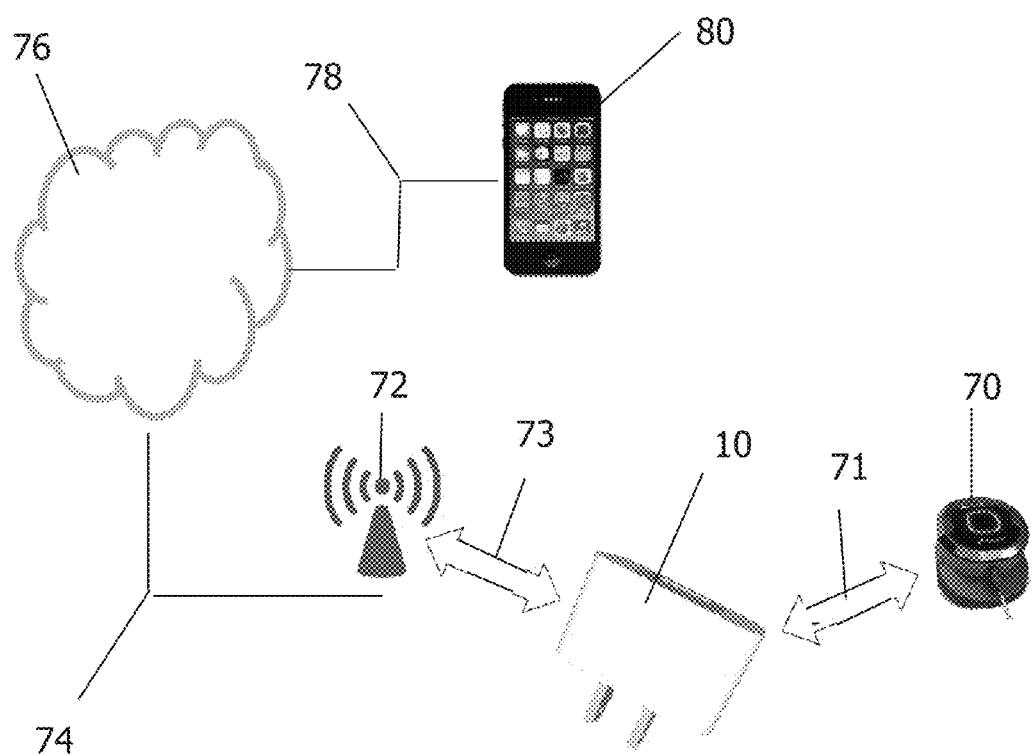
FIG. 4 is a schematic diagram illustrating the pass through wall power plug serving as a bridge between a device and a remote device via the internet.
Figure 5:
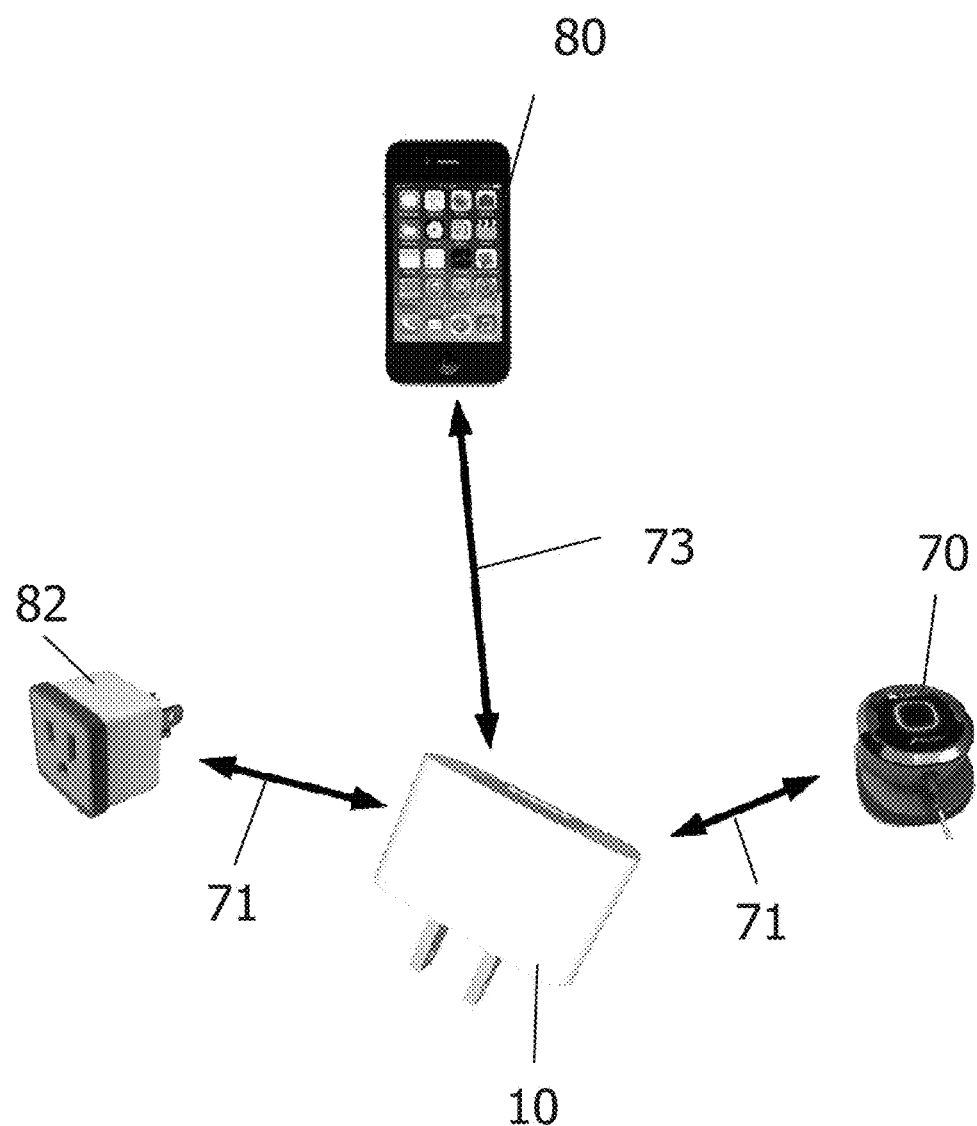
FIG. 5 is a schematic diagram of a pass through wall power plug serving as a bridge between multiple devices and a remote device in connection with the plug.
Figure 6:
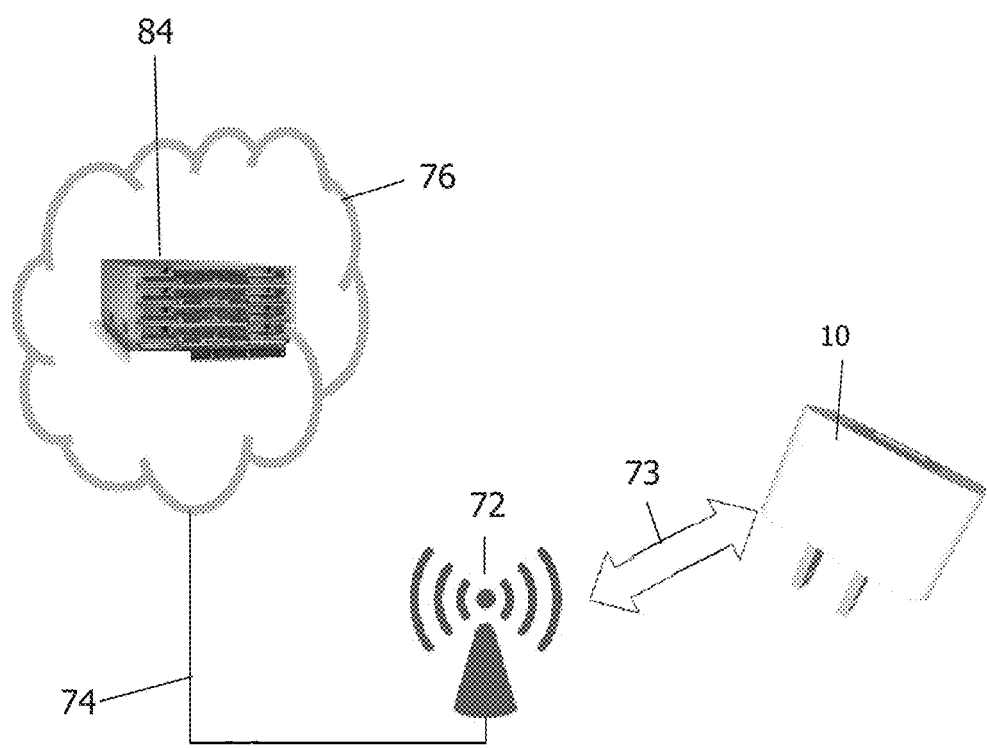
FIG. 6 is a schematic diagram illustrating a connection of a pass through wall power plug with a remote computer.

As shown schematically in FIGS. 4-6, the power plug may be used for remote communication between devices or appliances and remote devices via the internet. In the example shown in FIG. 4, the power plug 10 serves as a bridge between a Bluetooth-enabled connected device 70 and a remote device 80. However, it should be understood that devices 70 may communicate with the power plug 10 using any suitable communication system and protocol.

As shown in FIG. 4, connected device 70, depicted as a wireless thermometer, is equipped with Bluetooth radio for communication using a Bluetooth protocol 71. Connected device 70 transmits information, such as temperature, to power plug 10. Power plug 10 is equipped both with a communications module that is adapted to transmit information using Bluetooth communication protocol 71 and Wi-Fi communication protocol 73. Power plug 10 receives the temperature data from connected device 70 via Bluetooth protocol 71, and it translates the information into Wi-Fi communication protocol 73.

Remote device 80 is communicatively connected to the power plug 10 through a communication path. In the illustrated embodiment, this path includes an internet access point or radio beacon 72 for the wireless communication module (e.g. Wi-Fi) of the power plug 10, internet service provider (represented by communication lines 74), public Internet (represented by cloud 76), and an internet service provider (represented by communication lines 78), which may be the same or different than internet service provider 74.

Remote device 80 may include a computer program, e.g., an application, for interface between the user of the remote device 80 and the communication path to communicate with the power plug 10, and in certain embodiments, a connected device, such as connected device 70. An exemplary application on the remote device 80 may display, for example, a graphical user interface (not shown) that simulates the connected device's control system, e.g., a control panel. The remote device 80 used to receive the information may be any suitable computerized device, e.g., a smart phone, a tablet, a mobile computer, a desktop computer, etc.

In this manner, the remote device 80 may receive information from the connected device 70, even if the connected device 70 does not have a communication interface that permits the connected device 70 to transmit information to the internet access point 72. The connected device 70 can then, for example, utilize a battery with a reasonable expected battery life.

Still referring to FIG. 4, a user can input a control command directed to a connected device 70 on the remote device 80. The communication can be entered in any way known or that may later become known to those of skill in the art, including through a keypad, touch screen, or voice command. For example, when a remote device is equipped with the HomeKit® command system distributed by Apple Inc., a user is able to transmit commands to power plug 10 and connected device 70 simply by issuing a voice command to the Homekit system. Alternatively, the remote device 80 can contain a program that controls the connected device 70 without specific user input into the remote device 80.

The communication is then sent from the remote device 80 through the internet 76 to the internet access point 72, which transmits the communication, e.g., by Wi-Fi protocol 73 to the power plug 10. Power plug 10 then translates the command to Bluetooth protocol 71 and transmits it to connected device 70. In this fashion, Bluetooth enabled connected device 70 can be controlled via the internet. As an example, the remote device 80 can instruct the connected device 70 to turn on or off. As another example, the connected device is a thermostat that is operatively connected to a heating or cooling system, the user can instruct the thermostat to activate the heating/cooling system as desired.

Another example relates to remote communication with "smart" door locks. Smart door locks often run on batteries because electrical wiring is not practical for many door designs or is expensive, especially in retrofit applications. To save power, smart locks are often equipped with only Bluetooth or Bluetooth Low Energy communication radios. Using the invention, a user can enter a communication, such as a command, using an application on a remote device 80 to control the smart door lock, such as to lock or unlock the door. The command is then transmitted via the internet 76 and access point 72 to the pass through wall power plug 10. The pass through wall power plug 10 then converts the communication to Bluetooth or Bluetooth Low Energy protocol, and transmits the communication to the smart door lock. The smart door lock then responds to the communication, e.g., by unlocking the door. The smart door lock then can transmit information back to the pass through wall power plug (e.g., status of the door lock as locked or unlocked) via Bluetooth. The microcontroller 65 of the pass through wall power plug 10 transmits this information to the internet access point 72, e.g., via Wi-Fi protocol, and the information travels back to the remote device 80 via the internet, e.g., confirming the action desired by the user has been completed.

FIG. 5 depicts the pass through wall power plug 10 functioning to communicatively connect multiple devices 70, 82, e.g., different Bluetooth enabled devices, and a remote device. The microcontroller 65 can in effect serve as a receiver or base station for one or more accessory devices 70, 82, thereby providing continuous monitoring of or reception of data from accessory devices 70, 82 that are within range of the power plug 10. In the embodiment shown, power plug 10 is depicted as effecting communications between wireless thermometer 70 and wireless power cube 82. Both wireless thermometer 70 and wireless power cube 82 communicate with power plug 10, e.g., via Bluetooth protocol 71. Power plug 10 then may communicate information from both wireless thermometer 70 and wireless cube 82 to remote device 80, e.g., using Wi-Fi protocol 73. In some embodiments, for example, power plug 10 transmits information to remote device 80 only when requested by a user, or only when the user brings remote device 80 to within range of a proximity sensor in power plug 10.

The invention thus permits communication between devices 70, 82 that otherwise would not communicate with each other, e.g., due to physical distance separating them or incompatible protocols. In addition, the remote device 80 may monitor and/or be used to control one or more of the devices 70, 82. For example, if device 70 is a thermometer and device 82 has a heating/cooling unit plugged into it, thermometer 70 may send a temperature signal to device 82, via plug 10, which based on the reported temperature then activates the heating/cooling unit to control the temperature in the location of the heating/cooling unit. Thermometer 70, in further embodiments, may communicate the measured temperature to the remote device 80 via the plug 10, and plug 82 may communicate information about the heating/cooling unit 82, via the plug 10, to the remote device 80, e.g., power status (on/off), energy usage, operating time, etc. In yet further embodiments, the remote device 80 may transmit command instructions to one or more of the devices 70, 82 via the plug 10. This is accomplished although device 70, device 82, and/or the remote device 80 do not (and in some embodiments cannot) communicate directly with each other.

Although FIG. 5 illustrates only two devices being connected to the power plug 10, the power plug 10 can be used and configured to bridge as many devices as desired that are situated within the communications range of the power plug 10. Thus, a user can communicatively connect a number of accessory devices via the power plug, such as lights or lamps, and then merely communicatively connect to only the power plug 10 to control (e.g., turn on and off) all the lights, or some subset of the lights connected to the power plug. Advantageously, this capability allows for a user to connect to a single device, the power plug 10, rather than connecting to each accessory device individually. This is particularly advantageous in a "connected" home, set up with various home automation devices, such as plugs and/or outlets, wall switches, power strips, lamps, thermostats, garage door openers, door locks, and appliances. It should be noted that though in the embodiment of FIG. 5 the remote device 80 connects directly with the plug 10, in other embodiments the remote device 80 can connect to the plug via an indirect path, e.g., the internet, local intranet, or other communications system.

FIG. 6 illustrates another embodiment in which the power plug, for example, can be used to operatively connect devices, e.g., Bluetooth enabled appliances, with a remote computer system 84 and/or control such devices with the remote computer system 84. As described in FIG. 4 and FIG. 5, the power plug 10 is capable of receiving data from one or more devices (not shown in FIG. 6). The power plug 10 then uses wireless communication, such as Wi-Fi protocol 73, to communicate with remote computer 84. This communication can be accomplished through various waypoints, such as Wi-Fi access point 72, internet service provider 74, and public internet 76. In some embodiments, information or a command can be sent from a remote computer 84 to the power plug using 10, e.g., using internet and Wi-Fi communication.

The data transferred to remote computer 84 may be used for any suitable purpose as should be understood by those of skill in the art. For example, the remote computer may be used to store and analyze usage data received from the plug 10. This usage data, for example, can consist of times when an appliance plugged into the power plug 10 was turned on or off, or the current drawn by the appliance during the "on" period, which corresponds to energy consumption and peak power. The remote computer 84 may also use such data to determine an action to be taken, e.g., the best time to turn air conditioning on. The remote computer 84 may further calibrate its instructions in view of information other than that received from the appliance. For example, the remote computer may determine the best time to operate an air conditioner based both on past power consumption by the air conditioner, external temperature, and overall power usage in a power grid.

FIGS. 7A and 7B illustrate another embodiment of a pass through wall power plug 110. Power plug 110 may comprise the same or similar internal components and functionalities as power plug 10 of FIGS. 1-6. The primary difference between the embodiment of FIGS. 7A and 7B and the embodiment of FIGS. 1-3 is that external socket 136 and internal socket 134 have a different configuration. The illustrated configuration is suitable for use, for example, in the United Kingdom, Ireland, Malta, Malaysia, & Singapore. It should be noted that the power plug 110 has a "vertical" configuration, as opposed the "horizontal" configuration of the power plug 10. As discussed above, though, the power plug 10, 110 can be configured for use with any configuration of plug and socket that is known, or may become known.

Similar to power plug 10, housing 112, consisting of casing 111, top cover 114, and bottom cover 116, forms a substantially brick-like shape, though it can form any suitable or desired shape. The longest axis of the substantially brick-like shape is oriented in a vertical direction. In this orientation, more than one power plug 110 may be plugged into a faceplate with multiple outlets that are horizontally aligned, in a configuration resembling a row or line. As discussed in connection with power plug 10, the power plug 110 may take any geometric shape suitable for containing the elements and effecting the functions described herein.

In addition, in the depicted embodiment, light bar 118 and socket 136 are both located on front face 113 of the casing 111. Light bar 118 extends horizontally across casing 111, thereby providing similar functionality as light bar 18. Button 138 is located within side face 117, adjacent to AC power board 130, and thus is suitable for controlling a relay switch for a device that is plugged into socket 134 to control the power flow thereto.

While the above describes certain embodiments, those skilled in the art should understand that the foregoing description is not intended to limit the spirit or scope of the invention. It should also be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

What is claimed is:

1. A pass-through wall plug, comprising:
 a housing;
 a male plug accessible through a wall of the housing and configured to electrically connect to an electrical outlet, and a socket configured to electrically connect to an electrical device and to deliver electrical energy from the electrical outlet to the electrical device;

a first module within the housing configured to communicate wirelessly using a first communications protocol with a first remote electronic device;

a second module within the housing configured to communicate wirelessly using a second communications protocol with a second remote electronic device; and a microcontroller within the housing configured to communicate information between the first and second remote electronic devices;

wherein the housing defines a substantially brick shape comprising a front face, a first side face, a second side face, a rear face, a top face, and a bottom face;

a light bar extends horizontally across substantially the entire length of the front face;

the male plug extends though an opening in the rear face;

the socket is located within an opening in one of the side faces or the front face;

and a button is configured within an opening in the second side face, said button configured to control operation of a relay or switch configured to control power delivery to the electrical device.

2. The pass-through wall power plug as defined in claim 1, wherein the first and second communications protocols are different protocols from each other, and the microcontroller is further configured to translate between the first communications protocol and the second communications protocol.

3. The pass-through wall power plug as defined in claim 1, wherein the first communications protocol is Wi-Fi.

4. The pass-through wall power plug as defined in claim 1, wherein the second communications protocol is Bluetooth or Bluetooth Low Energy.

5. The pass through wall power plug as defined in claim 1, wherein the light bar is illuminated by one or more LEDs.

6. The pass through wall power plug as in claim 1, wherein the button is accessible through the housing.

7. The pass through wall power plug as in claim 1, wherein the housing is rotatable around the male plug while maintaining an electrical connection between the male plug and said socket.

8. The pass through wall power plug as in claim 1, wherein the width of the brick is sufficiently narrow so as to permit multiple pass through wall power plugs to be stacked within a standard North American face plate having multiple vertically arranged electrical outlets.

9. The pass through wall power plug as in claim 1 wherein the front face is substantially vertical.

10. A method comprising:

establishing a data communication connection between a pass through wall power plug and one or more accessory connected devices, said pass-through wall power plug including:

a housing;

a male plug accessible through a wall of the housing and configured to electrically connect to an electrical outlet, and a socket configured to electrically connect to an electrical device and to deliver electrical energy from the electrical outlet to the electrical device;

a first module within the housing configured to communicate wirelessly using a first communications protocol with a first remote electronic device;

a second module within the housing configured to communicate wirelessly using a second communications protocol with a second remote electronic device; and and a microcontroller within the housing configured to communicate information between the first and second remote electronic devices;

wherein the housing defines a substantially brick shape comprising a front face, a first side face, a second side face, a rear face, a top face, and a bottom face;

a light bar extends horizontally across substantially the entire length of the front face;

the male plug extends though an opening in the rear face;

the socket is located within an opening in one of the side faces or the front face; and a button is configured within an opening in the second side face, said button configured to control operation of a relay or switch configured to control power delivery to the electrical device;

receiving at the pass through wall power plug information transmitted from at least one of the one or more accessory connected devices;

storing the received information on the pass through wall power plug; and transmitting the received information from the pass through wall power plug to a remote device.

11. The method as defined in claim 10, wherein the one or more accessory devices comprise Bluetooth enabled devices, and the data communication connection comprises a wireless Bluetooth connection.

12. The method as defined in claim 10, wherein the transmitting step is initiated by one of (i) a command of the user or (ii) the bringing of the remote device to within range of a wireless proximity sensor located within the power plug.

* * * * *